July 14, 1931. W. H. ROBBINS ET AL 1,814,855
STEEL WOOL FILTER
Filed March 31, 1927  3 Sheets-Sheet 1
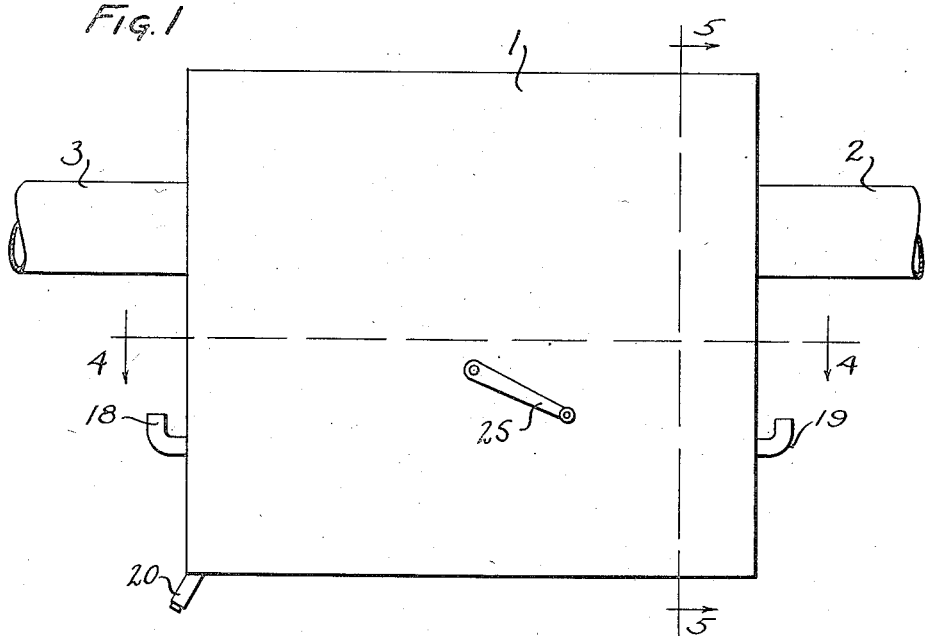
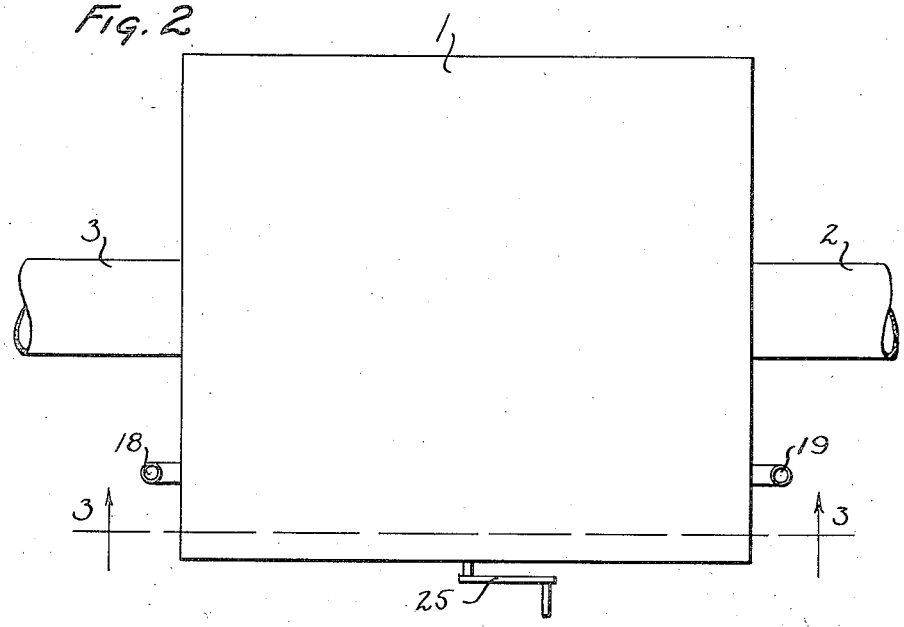

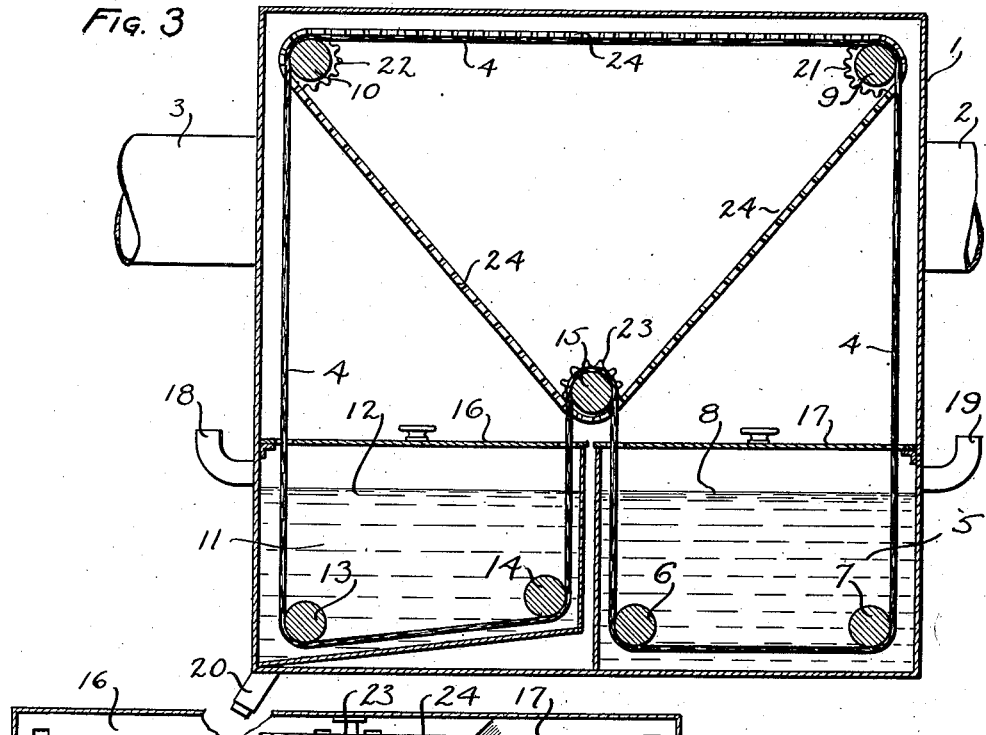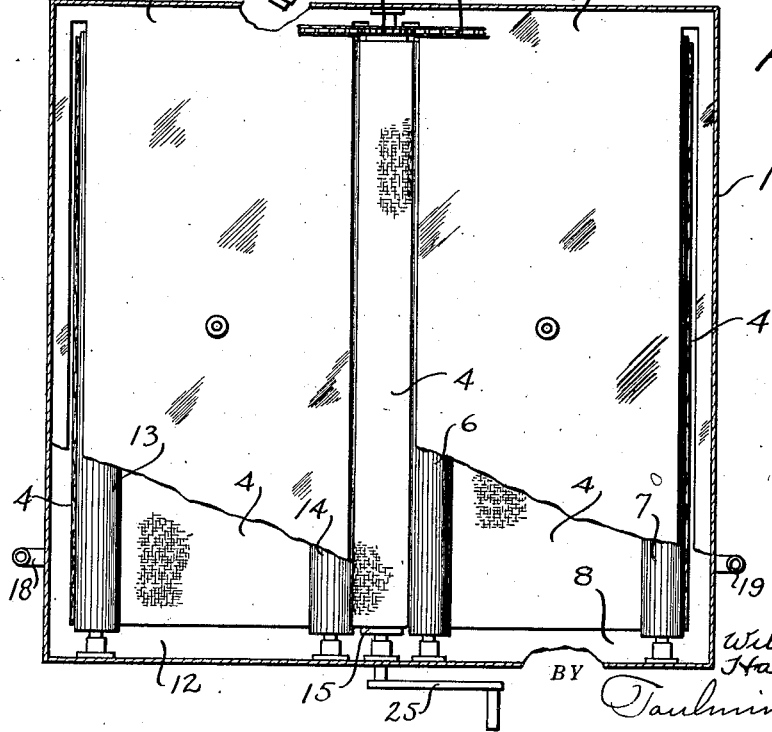

July 14, 1931.  W. H. ROBBINS ET AL  1,814,855
STEEL WOOL FILTER
Filed March 31, 1927   3 Sheets-Sheet 3

INVENTORS
William H. Robbins
Harry A. Toulmin Jr.
BY
ATTORNEY

Patented July 14, 1931

1,814,855

UNITED STATES PATENT OFFICE

WILLIAM H. ROBBINS, OF SPRINGFIELD, AND HARRY A. TOULMIN, JR., OF DAYTON, OHIO, ASSIGNORS TO THE WILLIAMS COMPANY, OF LONDON, OHIO, A CORPORATION OF OHIO

STEEL WOOL FILTER

Application filed March 31, 1927. Serial No. 179,973.

Our invention relates to filters and in particular to steel wool filters.

The object of our invention is to provide a steel wool filter which will automatically pick up a coating of material to assist in the filtering action and automatically discharge such material with its material collected from the gases which have passed over it.

It is a further object to provide such an arrangement in a closed casing so that all the moving parts and liquids are confined where they will not be exposed to outside conditions.

It is our object to provide means of replenishing the tanks of material utilized without the necessity of opening the casing, and to eliminate all hand operations of cleansing of steel wool filters which heretofore have made the filters difficult to clean and expensive to handle, particularly in installations in schools, hospitals and other places of similar character where the necessary shut-down of the heat and ventilating apparatus for the cleaning of the filter causes great inconvenience or loss or, upon occasion, is impossible.

In the accompanying drawings:

Figure 1 is a side elevation showing the exterior of the device;

Figure 2 is a plan view of the exterior;

Figure 3 is a section on the line 3—3 of Figure 2;

Figure 4 is a section on the line 4—4 of Figure 1 looking in the direction of the arrows;

Figure 5:
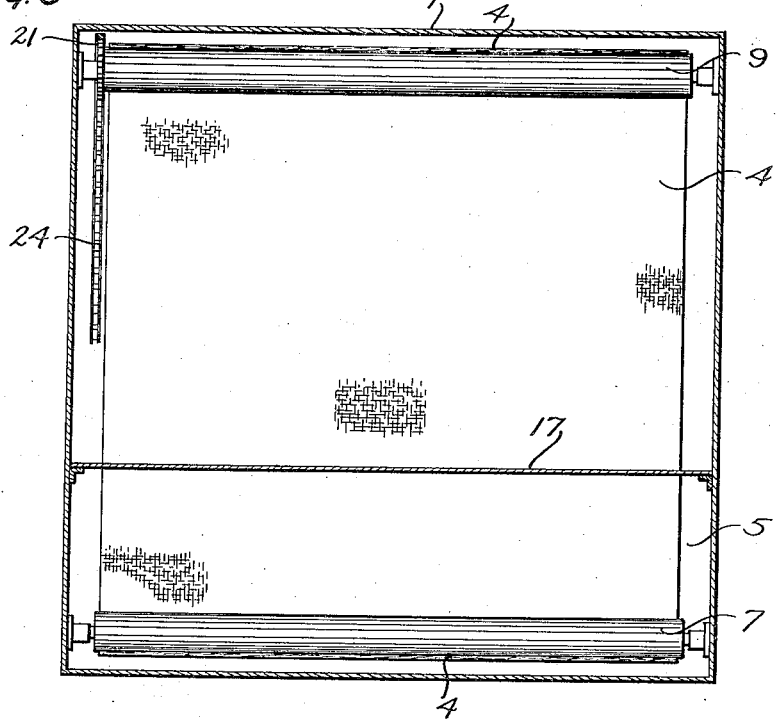
Figure 5 is a section on the line 5—5 of Fig. 1 looking in the direction of the arrows.
Figure 6:
Figure 6 is a section through the woven belt.
Figure 7:
Figure 7 is a section through the parallel strand belt.

Referring to the drawings in detail, 1 designates a casing having an inlet passageway 2 and an exit passageway 3. The gases entering in the chamber 1 with their burden of material which is to be filtered therefrom, making their exit in clean condition through the exit passageway 3. It will be obvious that the gases being filtered will pass through the steel wool belt or apron 4 which may consist of a plurality of steel wool strands, arranged side by side or in woven form. This passage through this material takes place twice. The gases pass through the outer surface of the steel wool belt when they first enter the chamber and then pass through the inner surface just before they make their exit, so that the material which adheres to the belt, such as fuel oil or any other substance capable of taking up foreign material in the gases will collect the material first on the outer surface and then on the inside or inner surface, thereby utilizing both surfaces of the belt and both surfaces of the material carried thereby.

The belt 4 is adapted to pass through a tank of such material, such as fuel oil, such tank being designated 5. In the tank are mounted rollers 6 and 7 around which the belt passes, and being located beneath the level of the liquid 8.

The belt passes upwardly in such a coated condition and thence over the upper roller 9 across the top of the casing to the roller 10, thence downwardly in front of the exit 3 into a cleaning tank 11 having cleaning fluid 12. The belt is guided beneath the surface of this cleaning fluid by the rollers 13 and 14 and thence passes upwardly over the roller 15 and again into the tank 5 containing the coating material. The tank 11 is provided with a closely fitting cover 16 and the tank 5 is provided with a similar closely fitting cover 17.

The tank 11 is provided with a filler spout projecting outside the casing, designated 12. The tank 5 is provided with a similar filler spout designated 19. The tank 11 is provided with a drain spout 20 for draining the material which is cleaned from the belt. The tank 11 is also provided with a sloping bottom so that all this material will drain to the drain opening 20.

The rollers 9 are provided with knurled surfaces and may be of either metal or wood. The several rollers 9, 10 and 15 are provided with sprockets 21, 22 and 23 connected by a chain 24. The roller 15 is provided with a handle 25 so that the rotation of that roller and of its companion rollers 9 and 10 will serve to move the belt either continuously or intermittently as desired.

It will be noted that the rollers in the tanks are generally mounted in bosses in the side walls of the tank so that there will be no leakage around their shafts out of the tank.

It will be noted that we desire to comprehend within our invention such modifications as may be necessary to adapt it to varying conditions and uses.

Having thus fully described our invention, what we claim as new and desire to secure by Letters Patent, is:

1. In a filter, a casing having inlet and exit openings and a steel wool belt adapted to move across said openings to intercept the gases passing through said casing, and means for actuating said belt, and means for automatically applying to said belt a coating of dust collecting material as the belt is actuated, and means for removing the dust collecting material and the dust collected thereby on the belt as the belt is so moved.

2. In combination, a casing having an inlet and an outlet opening, a steel wool belt arranged to move across said openings means to actuate said belt, a tank for coating material to coat said belt to collect dust, a tank for cleaning material to clean the coating material and the dust therefrom, and means to guide said belt through said tanks.

3. In combination, a casing having an inlet and an outlet opening, a steel wool belt arranged to move across said openings, means to actuate said belt, a tank for coating material to coat said belt to collect dust, a tank for cleaning material to clean the coating material and the dust therefrom, means to guide said belt through said tanks, and means connected to each of said tanks to permit the supply thereof from the exterior of said casing, and means to permit the removal of the material collected in the cleaning tank.

4. In combination, a casing having an inlet and an exit opening, a steel wool belt adapted to pass in front of the inlet opening and in front of the exit opening so arranged that the incoming gases will first strike the outer surface of the belt and just before making their exit will pass over the inner surface of the belt, a coating tank in the bottom of the casing below the inlet opening, a cleaning tank adjacent thereto below the exit opening, guide rollers in said tanks, a guide roller between said tanks, guide rollers above the inlet and exit openings respectively, a steel wool belt arranged over said rollers.

5. In combination, a casing having an inlet and an exit opening, a steel wool belt adapted to pass in front of the inlet opening and in front of the exit opening so arranged that the incoming gases will first strike the outer surface of the belt and just before making their exit will pass through the inner surface of the belt, a coating tank in the bottom of the casing below the inlet opening, said cleaning tank adjacent thereto below the exit opening, guide rollers in said tanks, a guide roller between said tanks, guide rollers above the inlet and exit openings respectively, said steel wool belt being arranged over said rollers, supply spouts extending from said tanks to the exterior of said casing, a drain spout from the cleaning tank extending to the exterior of said casing and detachable covers for each of said tanks.

In testimony whereof, we affix our signatures.

WILLIAM H. ROBBINS.
HARRY A. TOULMIN, Jr.